(12) United States Patent
Cicchiello et al.

(10) Patent No.: US 7,075,955 B2
(45) Date of Patent: Jul. 11, 2006

(54) INTEGRATED NARROW-LINE TUNABLE OPTICAL PARAMETRIC OSCILLATOR

(75) Inventors: James M. Cicchiello, Cary, IL (US);
Ronald K. Meyer, Chicago, IL (US);
Gerald Griffith, Western Springs, IL (US)

(73) Assignee: Northrop Grumman Corporation, Los Angeles, CA (US)

( * ) Notice: Subject to any disclaimer, the term of this patent is extended or adjusted under 35 U.S.C. 154(b) by 247 days.

(21) Appl. No.: 10/780,519

(22) Filed: Feb. 17, 2004

(65) Prior Publication Data

US 2005/0179987 A1    Aug. 18, 2005

(51) Int. Cl.
*H01S 3/10*    (2006.01)
(52) U.S. Cl. .............................. 372/21; 372/92; 372/98
(58) Field of Classification Search .................. 372/21
See application file for complete search history.

(56) References Cited

U.S. PATENT DOCUMENTS

| | | | | |
|---|---|---|---|---|
| 4,189,652 A | * | 2/1980 | Levinos et al. | 359/330 |
| 5,159,487 A | * | 10/1992 | Geiger et al. | 359/330 |
| 5,841,570 A | * | 11/1998 | Velsko | 359/330 |
| 6,215,800 B1 | * | 4/2001 | Komine | 372/22 |
| 6,421,166 B1 | * | 7/2002 | Velsko et al. | 359/330 |
| 2002/0041610 A1 | * | 4/2002 | Scully et al. | 372/4 |

OTHER PUBLICATIONS

Hawthorn et al., Littrow Configuration Tunable External Cavity Diode Laser With Fixed Direction Output Beam, Review of Scientific Instruments, Dec. 2001, vol. 72, No. 12.

* cited by examiner

*Primary Examiner*—Armando Rodriguez
*Assistant Examiner*—Rory Finneren
(74) *Attorney, Agent, or Firm*—Stetina Brunda Garred & Brucker

(57) ABSTRACT

An integrated optical parametric oscillator, having an optical parametric oscillation region to convert a pump source into a signal beam and an idler beam, and a fine-steering region to adjust optical path of the signal beam in order to finely select a required wavelength component of the signal beam. The optical parametric oscillator is contoured with a plurality of exterior planes with specific reflective characteristics to form a resonator of the idler beam while reflecting and diffracting the signal beam with a desired wavelength.

30 Claims, 2 Drawing Sheets

INTEGRATED NARROW-LINE TUNABLE OPTICAL PARAMETRIC OSCILLATOR

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

Optical parametric oscillation is a nonlinear process that converts a single input laser beam or a pump beam source into two lower energy-beams known as the signal beam and the idler beam. The wavelengths/frequencies of the various beams $\lambda_{pump}/f_{pump}$, $\lambda_{signal}/f_{signal}$, and $\lambda_{idler}/f_{idler}$ must satisfy:

$$\frac{1}{\lambda_{pump}} = \frac{1}{\lambda_{signal}} + \frac{1}{\lambda_{idler}}, \quad (1)$$

or equivalently $$\omega_{pump} = \omega_{signal} + \omega_{idler}. \quad (2)$$

Ideally, energy is conserved since the sum of photon energies of the signal beam and the idler beam is equal to the photon energy of the pump beam, that is, the energy of a photon is proportional to the frequency thereof. Therefore, it is possible to implement a laser capable of being continuously tuned over a wide range of wavelengths by adjustment of the optical parametric oscillation only. The optical parametric oscillation can be tuned to create a multicolor laser system by changing the grating spacing of the nonlinear crystal, for example, which can be achieved by controlling temperature of the nonlinear crystal, or accomplished by rotating the crystal relative to the incident light beam.

FIG. 1 shows a schematic setup of a typical optical parameter oscillator. As shown, a pump beam is generated from a pump laser 10 to propagate through an optically-nonlinear crystal 12 placed in an optical resonator comprised of a pair of mirrors 14. While traveling through the optically-nonlinear crystal 12, a small portion of the pump beam is converted into a signal beam and an idler beam. The signal beam and/or the idler beam are fed back by the mirrors 14I and 14O of the optical resonator. When the pump beam is coupled into the nonlinear optical crystal 12, the signal beam and the idler beam may be generated depending on the intensity of the pump beam and the reflectivities of the mirrors 14. Each optical parametric oscillator has a characteristic pump-intensity threshold. At and above the threshold, the amplification of the signal and idler beams compensates the resonator roundtrip loss caused by residual mirror transmission, crystal absorption, scattering, etc. If the optical parametric oscillator is pumped above the threshold, a significant amount of pump beam is converted into signal and idler radiation. In practice, the input mirror 14I is designed with maximum reflectivity for the signal beam and idler beam, and the output mirror 14O determines whether the optical parametric oscillator is singly- or doubly-resonant. That is, the output mirror 14O determines the proportions of the signal beam and the idler beam to be fed back to the nonlinear crystal 12 and resonated in the optical resonator.

Applications of optical parametric oscillation include light detection and ranging (LIDAR), high-resolution spectroscopy, medical research, environmental monitoring, display technology and precision-frequency metrology. In coherent-detection applications of LADAR, vibrometry, and free-space optical (FSO) communication, a tunable, narrow-line, high-power source with wavelength ($\lambda$) of 1.5 microns is required. For example, coherent LADAR could require a source of about 10 Watts to about 100 Watts at a wavelength ($\lambda$) of about 1.54 microns with tunability of 1 nanometer over a 50 micro-second chirp, and linewidth as narrow as 50 kHz. It is likely that LADAR will rely on gas lasers to achieve these narrow linewidths in the near term. Similarly, airborne, free-space-optical communications will require a wavelength of about 1.5 microns with some tunability within the C-band and the linewidths of 100 kHz in a coherent-detection mode. Airborne free-space-optical communication will rely on existing telecommunication components in the near term, such as a 1 micro-Watt laser diode, followed in series by erbium-doped fiber amplifiers (EDFA's) to achieve powers of 10 Watt. Polarization-maintaining erbium-doped fiber amplifiers are expensive; moreover, high-end, erbium-doped fiber amplifiers may provide no more than tens of Watts of power each. As the airborne free-space-optical range requirements increase, it is a challenge for sources to provide more power without sacrificing linewidth.

Nonlinear optics have been applied to the above missions for a number of years. For example, pumping optical parameter oscillators (OPO's) with Nd:YAG laser sources is a highly reliable approach for tunable, high-power sources. Materials used to pump optical parameter oscillators include periodically-poled lithium niobate ($LiNbO_3$ or PPLN). Tens of Watts at a wavelength of about 1.064 micrometers can be pumped into PPLN prior to approaching its laser-damage threshold. However, these types of optical parametric oscillators tend to have fairly broad linewidths.

Narrow-linewidth operation ($\Delta\lambda \sim 0.02$ nanometer) of optical parametric oscillator has been achieved using a Littrow configuration disclosed in literatures such as "Littrow Configuration Tunable External Cavity Diode Laser with Fixed Output Beam" by C. J. Hawthorn, K. P. Weber, R. E. Scholten in Review of Scientific Instrument, Vol. 72(12) pp4477–4479, December 2001. Bosenberg et al. have also demonstrated a single-crystal optical parametric oscillator based on $KTiOPO_4$ (KTP), a grating, and a tuning mirror. These disclosures indicated that fine tuning of one mirror provides a wavelength-selection mechanism, in which the optical parametric oscillator can be selectively seeded for a given narrow line. However, in these optical parametric oscillators, the resonator, the grating, and the nonlinear crystal are separate devices such that precise alignment is highly demanded, but it is laborious and time consuming. Further, this conventional approach involves mechanically tuning the mirror.

BRIEF SUMMARY OF THE INVENTION

The present invention provides an integrated optical parametric oscillator for converting a pump beam into a signal beam and an idler beam, while providing a fine tuning of the signal beam. The integrated tunable optical parametric oscillator comprises an optical parametric oscillation region, a grating, and a fine-steering region in one monolithic crystal.

The incident face is anti-reflective to the pump beam and reflective to the signal beam and the idler beam, such that the pump beam can be coupled into the crystal. After coupling into the crystal, the pump beam is converted into the signal beam and the idler beam by the optical parametric oscillation region in a first section of the crystal. The signal beam and the idler beam are then incident on the holographic grating. Portions of the signal and idler beams are specularly reflected by the grating towards the output face, while some of the signal and idler beams are diffracted towards the fine-tuning region. The output face is anti-reflective to the signal beam and reflective to the pump beam and the idler beam. Therefore, the signal beam is allowed to couple out of the crystal, while the idler beam is reflected back towards the grating. The reflecting face of the fine-tuning region is reflective to the pump beam, the signal beam and the idler beam. The fine-steering region is formed between its reflecting face and the grating. The fine-steering region produces an active index gradient to steer the signal beam to and from the grating. As the signal beam is steered back on the grating with a selected angle, the signal beam is seeded by the grating for a particular wavelength. Thereby, the tunability is obtained.

Preferably, the input face, the optical-parametric-oscillation region, the grating, the output face, and the fine-steering region are integrated on a single slab of a nonlinear optical bulk material. The nonlinear optical bulk material choices include lithium niobate crystal. The optical-parametric-oscillation region includes a part of the nonlinear optical bulk material being periodically poled, while the fine-steering region includes a part of the nonlinear optical bulk material and a pattern of electrodes deposited on two opposing surfaces thereof. That is, the fine-steering region includes a part of the nonlinear optical bulk material subjected to a dynamic electric field. In one embodiment, the pump beam has a wavelength of about 1.064 micrometers, the signal beam has a wavelength of about 1.54 micrometers, and the idler beam has a wavelength of about 3.442 micrometers. Alternatively, the pump beam has a wavelength of about 1.064 micrometers, the idler beam has a wavelength of about 1.54 micrometers, and the signal beam has a wavelength of about 3.442 micrometers. The choice of grating technique includes a holographic grating with about 200 grooves/mm to about 500 grooves/mm, for example.

The present invention also provides an integrated optical parametric oscillator, comprising a nonlinear optical bulk material, which includes a locally periodically-poled region and a fine-steering region subjected to an electric field. The nonlinear optical bulk material includes lithium niobate, and the locally periodically-poled region has a length of about 30 mm, for example. The nonlinear optical bulk material further comprises a plurality of exterior coated planes forming a resonator of a wave at predetermined wavelength.

The present invention further provides a tunable, narrow-line laser system comprising a pump beam source and an integrated parametric oscillator. The pump beam source is operative to generate a pump beam. The integrated optical parametric oscillator comprises a nonlinear optical bulk crystal. The nonlinear optical bulk crystal is contoured with an input face, a grating, an output face and a reflecting plane. Between the input face and the grating, an optical parametric oscillation region is formed. Between the grating and the reflecting plane of the fine-steering region, a fine-steering region is formed. The input face is anti-reflective to the pump beam, so that the pump beam can enter the nonlinear optical bulk crystal by transmitting through the input face. The optical parametric oscillation region is operative to convert the pump beam into a signal beam and an idler beam. Portions of the signal and idler beams are reflected towards the output face by the grating, while the other portions of the signal and idler beams are diffracted from the grating towards the reflecting plane. The output face allows the narrow-line signal beam to be coupled out while reflecting the idler beam back to the grating or the input face. Meanwhile, the signal and idler beams diffracted by the grating are reflected from the reflecting plane through the fine-steering region back to the grating. The fine-steering region is formed between the reflecting plane and the grating. An optical path difference of the reflected portion of the signal and idler beams is generated. Therefore, the incident angle of the reflective portion of the signal beam is changed, and wavelength tunability is obtained.

Preferably, the pump beam source includes a Nd:YAG laser operative to generate a pump beam with a wavelength of about 1.064 micrometers. The nonlinear optical bulk crystal includes a lithium niobate crystal. The optical parametric oscillation region includes a periodically-poled region of the nonlinear optical bulk crystal with a length of about 30 mm. The optical-parametric-oscillation region is operative to convert the pump beam into the signal beam with a wavelength of about 1.54 µm and the idler beam with a wavelength of about 3.442 µm. Or alternatively, the optical-parametric-oscillation region is operative to convert the pump beam into the signal beam with a wavelength of about 3.442 µm and the idler beam with a wavelength of about 1.54 µm. The fine-steering region includes a region of the nonlinear optical bulk crystal subjected to a dynamic electric field. Preferably, the input face, the grating, output face, and the reflecting plane are all reflective to the idler beam and arranged as a resonator of the idler beam. When the nonlinear optical bulk crystal is fabricated from zinc selenium (ZnSe), the spectral range between 1 micron and 5 microns, or 8 microns and 12 microns, can be facilitated.

BRIEF DESCRIPTION OF THE DRAWINGS

These, as well as other features of the present invention, will become apparent upon reference to the drawings wherein.

DETAILED DESCRIPTION OF THE INVENTION

Figure 1:
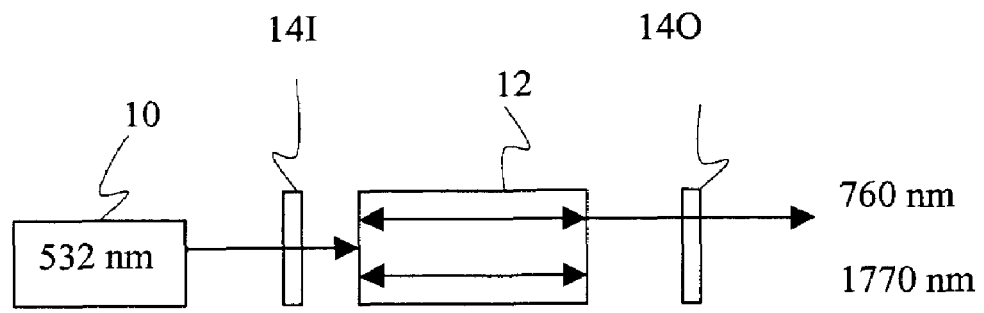
FIG. 1 shows a conventional optical parametric oscillator.
Figure 2:
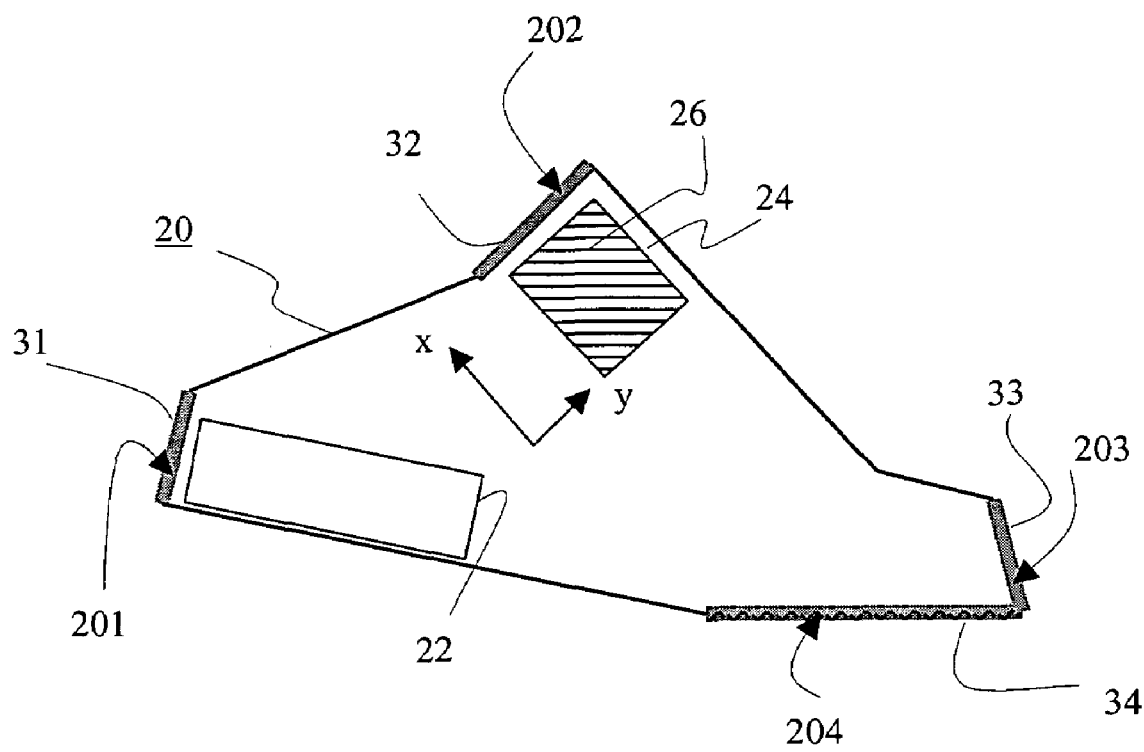
FIG. 2 shows a schematic drawing of an integrated optical parametric oscillator.

The present invention provides an optical parametric oscillator which integrates all critical components of the above Littrow configuration into a single slab of nonlinear optical material. As shown in FIG. 2, the optical parametric oscillator includes a single slab of nonlinear optical bulk material 20, preferably a lithium-niobate crystal (LiNbO$_3$). By locally periodically poling the nonlinear optical bulk material 20, a part of the nonlinear optical bulk material 20 functions as an optical-parametric-oscillation region 22 operative to convert a pump beam $\lambda_p$ into waves with wavelengths longer than that of the pump beam $\lambda_p$. As mentioned above, the converted waves include one signal beam $\lambda_s$ and one idler beam $\lambda_i$. For example, when the wavelength of the pump beam $\lambda_p$ is about 1.064 microns, the wavelengths of the signal and idler beams $\lambda_s$ and $\lambda_i$ converted by the optical-parametric-oscillation region 22 are about 1.54 microns and 3.442 microns, respectively. Preferably, the optical-parametric-oscillation region 22 has a length of about 30 mm. In addition to the optical-parametric-oscillation region 22, the nonlinear optical bulk material 20 further includes a fast, ultra-fine-steering region 24, which is formed by depositing a pattern of electrodes 26 on both sides of the nonlinear optical bulk material 20. By applying an electric field across the steering region 24 via the grid of the electrodes 26, the refractive index of the fine-steering region 24 is modulated, such that an optical path difference is induced to an optical wave propagating through the steering region 24. The optical path difference of the optical wave is proportional to the modulation of refractive index as:

$$OPD(x,y)=nL(x) \qquad (3),$$

where OPD(x,y) is the optical path difference in the x-y coordinate as shown in FIG. 2, n is the refractive index of the ultra-fine steering region 24, and L(x) is the effective length of the fine-steering region 24 along x-axis, which is the propagating direction within the ultra-fine steering region 24. The modulation of the refractive index n is a function of the electric field.

As shown in FIG. 2, the nonlinear crystal bulk material 20 is contoured to have several exterior planes, including an input face 201, a reflecting face 202, an output face 203 and a grating face 204. The integrated optical parametric oscillator further comprises at least three coatings 31, 32, and 33, and a holographic grating 34 formed on an input face 31, the reflecting plane 202, the output face 203, and the surface 204, respectively. The coatings 31, 32 and 33 are designed to be anti-reflective for light waves with predetermined wavelengths and highly reflective for light waves with other predetermined wavelengths. In this embodiment, a Nd:YAG laser pump source is selected to generate the pump beam $\lambda_p$ with the wavelength of about 1.064 microns, and the optical-parametric-oscillation region 22 is operative to convert the pump beam $\lambda_p$ into a signal beam $\lambda_s$ at 1.54 microns and an idler beam $\lambda_i$ at about 3.442 microns. The coating 31 is highly reflective to the signal and idler beams $\lambda_s$ and $\lambda_i$ and anti-reflective to the pump beam $\lambda_p$. Therefore, almost 100% of the pump beam $\lambda_p$ incident on the coating 31 will transmit through the coating 31, while most of the signal and idler beams $\lambda_s$ and $\lambda_i$ will be reflected thereby. The coating 32 is highly reflective to the pump beam $\lambda_p$, the idler beam $\lambda_i$ and the signal beam $\lambda_s$. The coating 33 is highly reflective to all of the pump source $\lambda_p$ and the idler beam $\lambda_i$, and is partially transmittive to the signal beam $\lambda_s$. When a light is incident onto the holographic grating 34, depending on the incident angle α, some of the incident light is diffracted, and some of the incident light is reflected. The signal beam $\lambda_s$, the pump beam $\lambda_p$, and the idler beam $\lambda_i$ will be reflected by the coating 32 on the reflecting plane 202. Regarding the coating 33, both of the pump beam $\lambda_p$ and the idler beam $\lambda_i$ and will be reflected thereby, and the signal beam $\lambda_s$ will be partially reflected thereby. As all of the coatings 31, 32 and 33 are highly reflective to the idler beam $\lambda_i$, the idler beam $\lambda_i$ will thus be resonated within the nonlinear optical bulk material 20. It will be appreciated that by adjusting the reflective characteristics of the coatings 31, 32 and 33, for example, the signal beam $\lambda_s$ could be resonated within the nonlinear optical bulk material 20, while the idler beam $\lambda_i$ could be coupled out. Alternatively, one can also design a degenerative or doubly-resonant optical parametric oscillator by adjusting the reflective characteristics of the coatings 31, 32, 33 and the grating 34.

Figure 3:
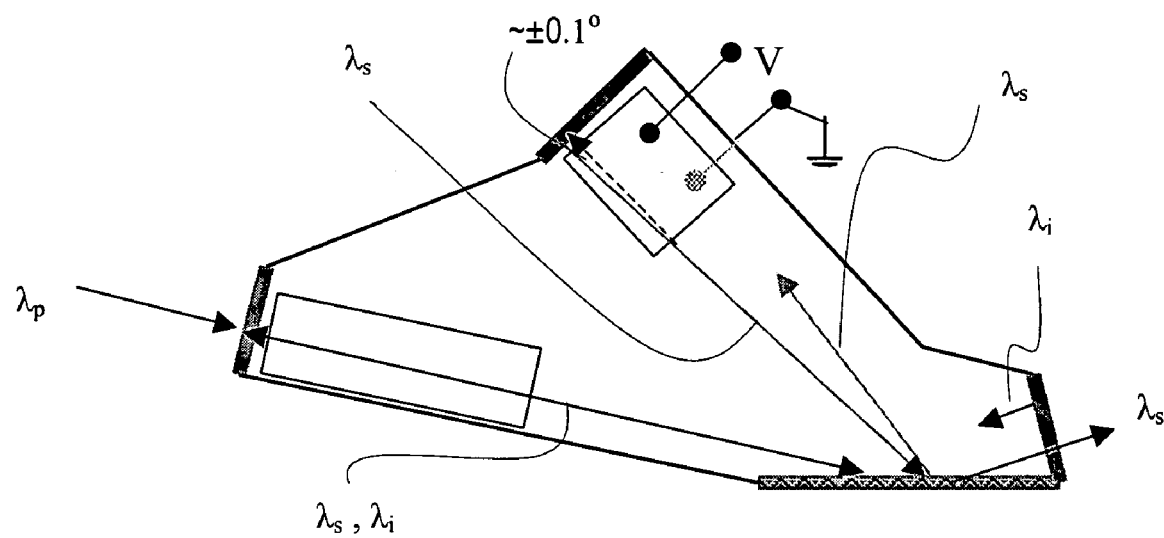
FIG. 3 shows the optical path of the pump wave, the signal beam and the idler beam within the integrated optical parametric oscillator.

FIG. 3 shows the optical paths of the pump beam $\lambda_p$, the signal beam $\lambda_s$ and the idler beam $\lambda_i$. As shown in FIGS. 2 and 3, the optical-parametric-oscillation region 22 is located immediately adjacent to the input face 201 along the optical path of the pump beam, such that after transmitting through the coating 31, the pump beam $\lambda_p$ is converted into the signal beam $\lambda_s$ at 1.54 microns and the idler beam $\lambda_i$ at 3.442 microns. The reflective characteristics of the coating 31 ensure that the pump beam $\lambda_p$ is the only input to the integrated optical parametric oscillator. On the other hand, in the situation that the signal and idler beams $\lambda_s$ and $\lambda_i$ generated by the optical-parametric-oscillation region 22 are reflected back to the coating 31, the high reflectance of the coating 31 to the signal and idler beams will then reflect these waves back to the nonlinear optical bulk material 20. Therefore, the loss due to reflection or other optical effects can be minimized.

The signal beam $\lambda_s$ and the idler beam $\lambda_i$ are then incident on the holographic grating 34. In other words, the optical parametric oscillation region 22 is located between the input face 201 and the grating 204 along optical path of the pump beam $\lambda_p$ as well as the signal and idler beams $\lambda_s$ and $\lambda_i$. As known in the art, when a light is incident on the holographic grating 34, some of the light is specularly reflected thereby, while some of the light is diffracted thereby according to the grating equation as follows:

$$m\lambda = d(\sin \alpha + \sin \beta) \qquad (4),$$

where m is the diffraction order, d is the groove spacing of the grating 34, α is the incident angle to the grating 34, and β is the diffraction angle by the grating 34. In the present invention, by adjusting the diffraction angle β, the signal beam $\lambda_s$ can be tuned to a desired wavelength. The holographic grating 34 used in this embodiment has 200 to 500 grooves per millimeter, for example. In this embodiment, as the holographic grating 34 is permanently attached to or integrated on the grating 204, the adjustment of the diffraction angle β of the incident light cannot be achieved by mechanically re-orienting the holographic grating 34. In addition to the pre-designed geometry of the nonlinear optical bulk material 20, a fine adjustment of the diffraction angle β is achieved by modulating the ultra-fine steering region 26.

In this embodiment, the coating 33 is designed to be partially transmissive at 1.54 microns and highly reflective at 3.442 microns; and therefore, the portion of the signal beam $\lambda_s$ reflected by the holographic grating 34 partially transmits through the coating 33. It is appreciated that as the signal beam $\lambda_s$ has been diffracted by the holographic grating 34, the wavelength of the output wave will be slightly tuned around 1.54 microns. Meanwhile, the idler $\lambda_i$ reflected by the grating 34 is reflected by the coating 33 back towards the grating 34. As all of the coatings 31, 32 and 33 and the holographic grating 34 are highly reflective at the wavelength of the idler beam $\lambda_i$, the idler beam $\lambda_i$ is resonating within the nonlinear optical bulk material 20.

While the portion of the signal beam $\lambda_s$ diffracted by the holographic grating 34 emerges from the output face 203 as the output wave, the other portion of the signal beam $\lambda_s$ diffracted by the holographic grating 34 propagates through the ultra-fine steering region 24 towards the coating 32. The signal beam $\lambda_s$ is then reflected by the coating 32 back through the ultra-fine steering region 24, and is incident on the holographic grating 34 again. As mentioned above, by applying an electric field across the steering region 24, the signal beam $\lambda_s$ is steered. One can control the electric field to adjust the optical path difference when the signal beam $\lambda_s$ is propagating from the holographic grating 34 to the coating 32, and/or when the signal beam $\lambda_s$ is propagating from the coating 32 to the holographic grating 34. Being reflected by the coating 32, the modulated signal beam $\lambda_s$ is incident onto the holographic grating 34 with a precisely selected angle β. As shown in FIG. 3, various wavelength components of the signal beam $\lambda_s$ are diffracted by the grating 34 to propagate through the ultra-fine steering region 26 towards the reflecting plane 302. It is known that only the normal incident wavelength component will be reflected by the coating 32 along the same optical path back towards the grating 34. By adjusting the voltage V applied to the ultra-fine steering region 24, a selected component of the signal wave $\lambda_s$ will be steered with a normal incident angle upon the reflecting plane 202 as indicated by the dashed line in FIG. 3. Thereby, the selected wavelength component of the signal wave $\lambda_s$ can be collected at the output face 203. When the component with another wavelength is required, the voltage applied to the ultra-fine steering region 24 is adjusted to a different value, such that such wavelength component can be collected at the output face 203. Therefore, the tunability of the signal wave $\lambda_s$ is obtained. Preferably, the steering angle of the wavelength components generated by the ultra-fine steering region 24 is about ±0.1°.

This disclosure provides exemplary embodiments of an integrated optical parametric oscillator. The scope of this disclosure is not limited by these exemplary embodiments. Numerous variations, whether explicitly provided for by the specification or implied by the specification, such as variations in shape, structure, dimension, type of material or manufacturing process may be implemented by one of skill in the art in view of this disclosure.

What is claimed is:

1. An integrated optical parametric oscillator:
   an input face being anti-reflective to an incident pump beam;
   an optical-parametric-oscillation region along an optical path of the pump beam, the optical-parametric-oscillation region being operative to convert the pump beam into a signal beam and an idler beam, wherein the input face is reflective to the signal beam and the idler beam;
   a grating along an optical path of the signal beam and the idler beam converted by the optical-parametric-oscillation region, the grating being operative to diffract at least a portion of the signal beam;
   a reflecting plane positioned along an optical path of the signal beam diffracted by the grating, wherein the reflecting plane is reflective to the signal beam;
   an ultra-fine-steering region between the reflecting plane and the grating, the ultra-fine-steering region being operative to steer the optical path of the signal beam diffracted from the grating; and
   an output face along an optical path of the signal beam reflected from the grating, the output face being reflective to the pump beam and the idler beam and partially transmissive to the signal beam.

2. The integrated optical parameteric oscillator of claim 1, wherein the ultra-fine-steering region is operative to select a narrow line of the signal beam by steering the optical path of the signal beam diffracted from the grating.

3. The integrated optical parametric oscillator of claim 1, wherein the input face, the optical-parametric-oscillation region, the grating, the output face, the reflecting plane and the fine-steering region are integrated on a single slab of a nonlinear optical bulk material.

4. The integrated optical parametric oscillator of claim 3, wherein the nonlinear optical bulk material includes a lithium niobate material.

5. The integrated optical parametric oscillator of claim 3, wherein the optical parametric-oscillation region includes a part of the nonlinear optical bulk material being periodically poled.

6. The integrated optical parametric oscillator of claim 3, wherein the ultra-fine-steering region includes a part of the nonlinear optical bulk material and a pattern of electrodes deposited on two opposing surfaces of thereof.

7. The integrated optical parametric oscillator of claim 3, wherein the ultra-fine-steering region includes a part of the nonlinear optical bulk material subjected to an electric field.

8. The integrated optical parametric oscillator of claim 1, wherein the pump beam has a wavelength of about 1.064 micrometers, the signal beam has a wavelength of about 1.54 micrometers, and the idler beam has a wavelength of about 3.442 micrometers.

9. The integrated optical parametric oscillator of claim 1, wherein the pump beam has a wavelength of about 1.064 micrometers, the idler beam has a wavelength of about 1.54 micrometers, and the signal beam has a wavelength of about 3.442 micrometers.

10. The integrated optical parametric oscillator of claim 1, wherein the grating includes a holographic grating with about 200 grooves/mm to about 500 grooves/mm.

11. An integrated optical parametric oscillator, comprising a nonlinear optical bulk material in which a locally periodically-poled region and a fine-steering region subjected to an electric field are formed.

12. The integrated optical parametric oscillator of claim 11, further comprising a grating between the locally periodically poled region and the steering region to diffract an optical signal into various wavelength components towards the fine-steering region.

13. The integrated optical parametric oscillator of claim 12, wherein the fine steering region is operative to steer a selected one of the wavelength components with a predetermined angle.

14. The integrated optical parametric oscillator of claim 11, further comprising a reflecting plane to reflect the steered wavelength component back to the grating.

15. The integrated optical parametric oscillator of claim 11, wherein the nonlinear optical bulk material includes lithium niobate.

16. The integrated optical parametric oscillator of claim 11, wherein the locally periodically-poled region has a length of about 30 mm.

17. The integrated optical parametric oscillator of claim 11, wherein the nonlinear optical bulk material further comprises a plurality of exterior coated planes forming a resonator of a wave at a predetermined wavelength.

18. A tunable, narrow-line laser system, comprising:
   a pump beam source, operative to generate a pump beam;
   an integrated optical parametric oscillator, including a nonlinear optical bulk crystal, which further comprises:
   an input face of the pump beam;
   an optical-parametric-oscillation region converting the pump beam into a signal beam and an idler beam;
   a grating reflecting a portion of the signal and the idler beam and diffracting the other portion of the signal beam and the idler beam;
   an output face, coupling out the portion of the signal beam reflected from the grating and reflecting the portion of the idler beam reflected from the grating;

a reflecting plane, reflecting the other portion of the signal and idler beams diffracted from the grating; and a fine-steering region between the grating and the reflecting plane for generating an optical path difference of the other portion of the signal and idler beams reflected from the reflecting plane and incident on the grating.

19. The tunable, narrow-line laser system of claim 18, wherein the pump beam source includes a Nd:YAG laser.

20. The tunable, narrow-line laser system of claim 18, wherein the nonlinear optical bulk crystal includes a lithium niobate crystal.

21. The tunable, narrow-line laser system of claim 18, wherein the optical-parametric-oscillation region includes a periodically-poled region of the nonlinear optical bulk crystal.

22. The tunable, narrow-line laser system of claim 18, wherein the optical-oscillation-region has a length of about 30 mm.

23. The tunable, narrow-line laser system of claim 18, wherein the optical-parametric-oscillation region being operative to convert the pump beam into the signal beam with a wavelength of about 1.54 µm and the idler beam with a wavelength of about 3.442 µm.

24. The tunable, narrow-line laser system of claim 18, wherein the optical-parametric-oscillation region being operative to convert the pump beam into the signal beam with a wavelength of about 3.442 µm and the idler beam with a wavelength of about 1.54 µm.

25. The tunable, narrow-line laser system of claim 18, wherein the fine-steering region includes a region of the nonlinear optical bulk crystal subjected to an electric field.

26. The tunable, narrow-line laser system of claim 18, wherein the input face, the grating, output face, and the reflecting plane are all reflective to the idler beam and arranged as a resonator of the idler beam.

27. The tunable, narrow-line laser system of claim 18 being operative to generate a narrow-line output with a first power to seed a laser or an optical parametric oscillator with a second power, wherein the second power is higher than the first power.

28. The tunable, narrow-line laser system of claim 27 being operative to generate the narrow-line output at about 1.5 microns.

29. The tunable, narrow-line laser system of claim 27 being operative to generate the narrow-line output between 1 microns and 5 microns.

30. The tunable, narrow-line laser system of claim 27 being operative to generate the narrow-line output between 8 microns and 12 microns.

* * * * *